(12) United States Patent
Pate et al.

(10) Patent No.: US 12,020,598 B2
(45) Date of Patent: Jun. 25, 2024

(54) COLOR IDENTIFICATION SAFETY SYSTEM

(71) Applicants: Charles Michael Pate, Friendswood, TX (US); Michele De Isabella, Brugherio (IT)

(72) Inventors: Charles Michael Pate, Friendswood, TX (US); Michele De Isabella, Brugherio (IT)

(73) Assignee: Direct Purchase Quick Couplings, Incorporated, Alvin, TX (US)

( * ) Notice: Subject to any disclaimer, the term of this patent is extended or adjusted under 35 U.S.C. 154(b) by 16 days.

(21) Appl. No.: 15/140,197

(22) Filed: Apr. 27, 2016

(65) Prior Publication Data

US 2016/0358517 A1 Dec. 8, 2016

Related U.S. Application Data

(60) Provisional application No. 62/155,819, filed on May 1, 2015.

(51) Int. Cl.
*G09F 3/00* (2006.01)
*F16L 19/025* (2006.01)
*F16L 55/00* (2006.01)
*G09F 3/02* (2006.01)

(52) U.S. Cl.
CPC .......... *G09F 3/0295* (2013.01); *F16L 19/025* (2013.01); *F16L 55/00* (2013.01); *F16L 2201/10* (2013.01); *F16L 2201/60* (2013.01); *G09F 2003/0251* (2013.01)

(58) Field of Classification Search
CPC ............ G09F 3/0295; G09F 2003/0251; F16L 19/05; F16L 2201/60; F16L 19/025; F16L 17/06; F16L 2201/10; F16L 55/00; F16L 37/14
USPC .................................................. 285/93, 119
See application file for complete search history.

(56) References Cited

U.S. PATENT DOCUMENTS

| | | | | |
|---|---|---|---|---|
| 1,978,245 A * | 10/1934 | Barker | .................... | F16L 19/00 285/39 |
| 2,661,768 A * | 12/1953 | Novak | ...................... | F16L 1/11 138/44 |
| 2,988,385 A * | 6/1961 | Foelester | .............. | F16L 43/001 285/179 |
| 3,170,667 A * | 2/1965 | Szohatzky | ............ | F16L 37/407 251/149.6 |
| 4,046,387 A * | 9/1977 | Lee | ...................... | F16J 15/3296 250/370.11 |
| 4,302,033 A * | 11/1981 | Evans | ................. | F16L 27/0816 285/14 |
| 4,540,619 A * | 9/1985 | Watanabe | ............... | B29C 61/10 428/192 |
| 4,648,628 A * | 3/1987 | Meadows | ............... | F16L 31/02 285/133.11 |
| 4,659,119 A * | 4/1987 | Reimert | ................ | E21B 17/043 285/82 |

(Continued)

*Primary Examiner* — Matthew Troutman
*Assistant Examiner* — Fannie C Kee
(74) *Attorney, Agent, or Firm* — Ramey LLP

(57) ABSTRACT

A high pressure coupling safety system where the nipple in the coupling are color-coded with bands within grooves. The color-coded bands are recessed within the grooves in order to prevent damage to the grooves by mishandling the nipples or the couplings. The bands are typically constructed of a material that is resistant to ultraviolet light, hydrocarbons, and chemicals.

13 Claims, 1 Drawing Sheet

(56) References Cited

U.S. PATENT DOCUMENTS

| | | | | | |
|---|---|---|---|---|---|
| 4,696,326 | A * | 9/1987 | Sturgis | | B67D 7/0294 137/614.04 |
| 5,022,687 | A * | 6/1991 | Ariga | | F16L 37/0927 285/321 |
| 5,623,890 | A * | 4/1997 | Lenske | | A62B 3/00 116/205 |
| 6,502,604 | B1 * | 1/2003 | Lewis | | F16L 55/115 138/89 |
| 6,504,103 | B1 * | 1/2003 | Meyer | | H01R 13/53 174/167 |
| 7,195,288 | B2 * | 3/2007 | Weinhold | | F16L 19/0206 285/354 |
| 8,794,679 | B2 * | 8/2014 | Yamamoto | | F16L 19/005 285/386 |
| 8,888,145 | B1 * | 11/2014 | Crompton | | F16L 13/142 285/369 |
| 9,334,995 | B2 * | 5/2016 | Kremer | | F16L 37/248 |
| 2001/0040374 | A1 * | 11/2001 | Breihan | | E21B 17/00 285/93 |
| 2002/0011730 | A1 * | 1/2002 | Stickan | | F16L 37/107 285/93 |
| 2004/0084486 | A1 * | 5/2004 | Raterman | | B05C 11/10 222/529 |
| 2005/0097763 | A1 * | 5/2005 | Williams | | F16L 19/00 33/501.45 |
| 2006/0082151 | A1 * | 4/2006 | Persohn | | F16L 37/084 285/321 |
| 2007/0082532 | A1 * | 4/2007 | Morris | | H01R 13/629 439/352 |
| 2007/0082533 | A1 * | 4/2007 | Currier | | H05H 1/34 439/352 |
| 2007/0257484 | A1 * | 11/2007 | Schindel | | F16L 37/28 285/93 |
| 2010/0289256 | A1 * | 11/2010 | Shumard | | F16L 21/03 285/18 |
| 2011/0278837 | A1 * | 11/2011 | Yamamoto | | F16L 19/005 285/87 |
| 2012/0006419 | A1 * | 1/2012 | Richardson | | F16L 37/252 137/15.01 |
| 2012/0211974 | A1 * | 8/2012 | Richardson | | A62C 33/00 285/93 |
| 2013/0161941 | A1 * | 6/2013 | Zulauf | | F16L 19/005 285/80 |

\* cited by examiner

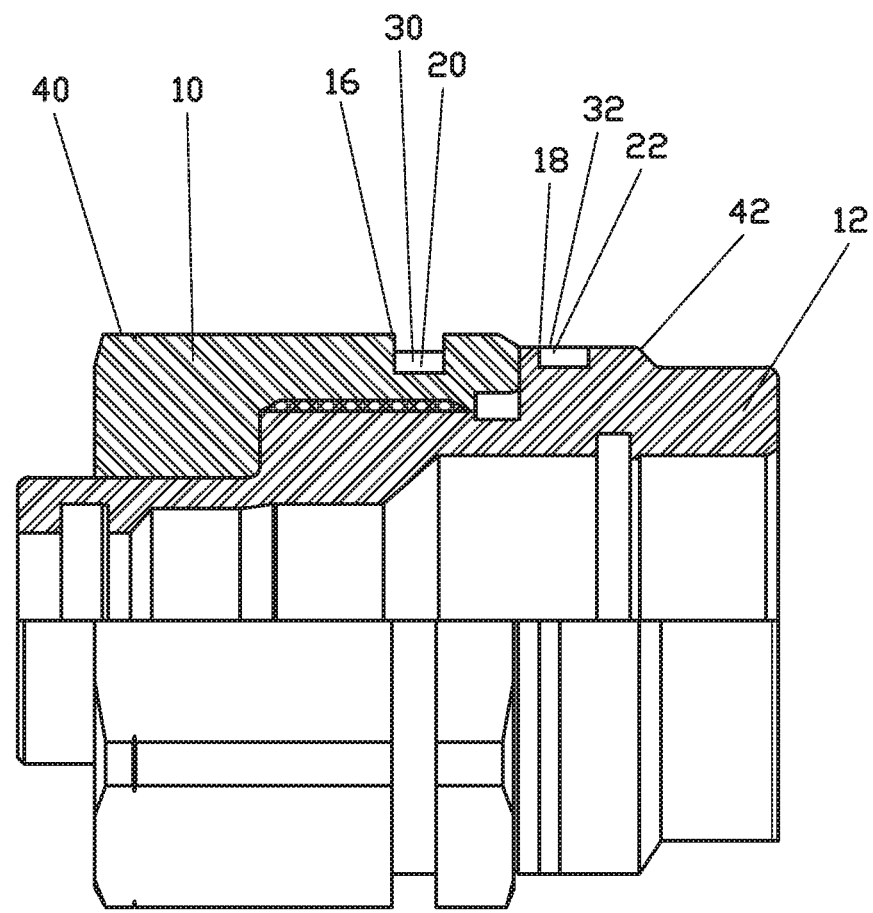

COLOR IDENTIFICATION SAFETY SYSTEM

CROSS-REFERENCE TO RELATED APPLICATIONS

This application claims priority to U.S. Provisional Patent Application No. 62/155,819 that was filed on May 1, 2015.

BACKGROUND

In many industries high-pressure fluids are used as force transfer media. These fluids are directed in some instances through tubulars and in other instances through hoses. In most instances fittings are used in order to connect and disconnect the hoses and tubulars from one input or output to another input or output. There are times when several different configurations are created but the couplers and nipples are the same size and the user can mistake the connections. While each coupler and its associated nipple may be designated with a part number, over time the part numbers may become damaged or otherwise obscured or a separate reference manual may be needed to associate a, for instance, coupling part number with its corresponding nipple part number. In the field users sometimes will have to use trial and error to identify the correct connections thereby making cross connection not only possible but probable. Cross connection of these systems can result in wasted time, damaged equipment, or serious personal injury.

SUMMARY

One solution to the problem is to add color codes to the fittings, couplings, or nipples in a particular manner so that a particular fitting may be easily and correctly associated with its corresponding fitting. Such a system will be referred to hereafter as the color safe system. The color safe system was created to eliminate problem of mis-connecting fittings saving both time and preventing damage to systems or personnel.

The color safe system allows the user to quickly identify the correct connections and properly connect the coupler and its nipple mate. Each color in the color safe system designates a specific connection. While any color may be used to identify one fitting with a corresponding fitting, initially the colors in the color safe system are based on United States standards for hydraulic power transmission established by the American National Standards Institute®.

Under the United States standards red is used to indicate a line having operating or system pressure, blue is used to indicate a line having exhaust or return flow, green is used to indicate a line having intake flow such as a case drain, yellow is used to indicate a line having measured or metered flow, orange is used for a line having reduced pressure, pilot pressure, or changing pressure, violet is used to indicate a line having intensified pressure, and black or blank is used to indicate a line having an active fluid. By having associated fittings marked with colors the correct connections and lines may be easily identified so that fittings, couplings, or nipples may not be easily mis-connected.

In the past it has been found that merely painting or otherwise coloring associated fittings was not a suitable solution as the environment of the couplings such as UV light exposure, saltwater, hydraulic fluids, industrial chemicals, and tools used on the couplings tend to degrade the coloring to the point where the coloring is unusable for its intended purpose.

BRIEF DESCRIPTION OF THE DRAWINGS

FIG. 1 depicts an example of a side view of a coupled coupling and nipple each having an identifier band.

DETAILED DESCRIPTION

In order to overcome such problems, in one embodiment it was found to be desirable to form a first groove 16 in the coupling 10 and a second groove 18 in the associated nipple 12. A band 20 is then placed within first groove 16 and a band 22 is placed within second groove 18, where each band 20 and band 22 have the same color. Typically the bands 20 and 22 are placed in grooves 16 and 18 such that they are snug and resist rotation or other movement. Such movement causes wear and degradation of the bands. The grooves 16 and 18 are formed such that the upper surface 30 of band 20 does not extend radially outward past the outer surface 40 of coupling 10 and the upper surface 32 of band 22 does not extend radially outward past the outer surface 42 of the associated nipple 12. By preventing each of the bands 20 and 22 from extending past the outer surface of the associated fitting the bands are protected from being damaged by tools or other external mechanical damage.

It has been found that in certain instances the bands 20 and 22 should be replaced so that where bands 20 and 22 may initially have a first color the bands 20 and 22 are replaceable so that the bands may be replaced with bands of a second color. Or alternatively in the unlikely event that the bands 20 and 22 may be damaged the bands 20 and 22 are replaceable.

In another embodiment it was found desirable to form each band such as band 20 and 22 of a material chosen to have properties of resistance to both ultraviolet light and hydrocarbons such as hydraulic fluid. In other instances it may be desirable to choose the material for resistance to particular industrial chemicals or other environmental contaminants. For use where the environment included exposure to ultraviolet light and hydraulic fluid it was found preferable to form the bands of polyether or polyester.

The color designated couplers allow hydraulic mechanics, technicians, and operational personal to identify case drain lines, return lines, pilot lines, pressure lines and gauge/meter lines immediately resulting in a safer working environment.

In other embodiments designators such as shaped bands either with or without colors or multicolored designators may be used. The designators may also combine shapes and colors.

While the embodiments are described with reference to various implementations and exploitations, it will be understood that these embodiments are illustrative and that the scope of the inventive subject matter is not limited to them. Many variations, modifications, additions and improvements are possible.

Plural instances may be provided for components, operations or structures described herein as a single instance. In general, structures and functionality presented as separate components in the exemplary configurations may be implemented as a combined structure or component. Similarly, structures and functionality presented as a single component may be implemented either singly or in conjunction with other features. These and other variations, modifications, additions, and improvements may fall within the scope of the inventive subject matter.

What is claimed is:

1. A pressure fitting safety system comprising:
   a pressure fitting having a coupling and a nipple;
   wherein the coupling includes a nut with a polygonal shaped outer surface;
   the coupling having a groove positioned on the outer surface and a first shoulder;
   the nipple having a groove and a second shoulder;
   wherein the first shoulder abuts the second shoulder;
   wherein the coupling is threaded onto the nipple;
   a first band having a designator;
      wherein the first band is within the groove in the coupling; and
   a second band having the designator;
      wherein the second band is within the groove in the nipple.

2. The pressure fitting safety system of claim 1, wherein the designator is a color.

3. The pressure fitting safety system of claim 1, wherein the designator is a shape.

4. The pressure fitting safety system of claim 1, wherein the designator is two or more colors.

5. The pressure fitting safety system of claim 1, wherein the designator is a shape and a color.

6. The pressure fitting safety system of claim 1, wherein the pressure fitting is configured for hydraulic transmission.

7. The pressure fitting safety system of claim 1, wherein the first band has an upper surface wherein the upper surface is recessed within the groove in the coupling.

8. The pressure fitting safety system of claim 1, wherein the second band has an upper surface wherein the upper surface does not extend beyond the outer surface of the nipple.

9. The pressure fitting safety system of claim 1, wherein the first and second bands are chemical resistant.

10. The pressure fitting safety system of claim 1, wherein the first and second bands are hydrocarbon resistant.

11. The pressure fitting safety system of claim 1, wherein the first and second bands are ultraviolet light resistant.

12. The pressure fitting safety system of claim 1, wherein the first and second bands are polyester.

13. The pressure fitting safety system of claim 1, wherein the first and second bands are polyether.

* * * * *